2,995,609
HYDRATION OF OLEFIN WITH MOLYBDENUM OXIDE CATALYST
Kenneth J. Frech, Kent, Ohio, and Raymond C. Odioso and Robert C. Zabor, Glenshaw, Pa., assignors to Gulf Research & Development Company, Pittsburgh, Pa., a corporation of Delaware
No Drawing. Filed Dec. 4, 1958, Ser. No. 778,086
5 Claims. (Cl. 260—641)

This invention relates to the hydration of olefins and more particularly this invention relates to the hydration of olefins with a molybdenum oxide catalyst.

Molybdenum oxide is an active catalyst for the hydration of olefins to their corresponding alcohols. However, we have found that under hydration reaction conditions certain oxides of molybdenum do not remain stable. As used in this application the word "stable" refers to chemical stability and specifically refers to chemical stability against oxidation or reduction. When such catalytically unstable oxides of molybdenum are put onstream as olefin hydration catalysts, their oxidation state tends to change to the more stable catalytic form. This stable catalytic form has an approximate formula of $MoO_{2.75}$ and is probably a mixture of at least two oxides representing different valence states of molybdenum. If the molybdenum originally put on-stream has a formula of $MoO_{2.75}$, its oxidation state will remain unchanged under reaction conditions whereas if a form of molybdenum oxide having an oxidation state higher than this stable form, such as $MoO_3$, is put onstream it will be reduced to the $MoO_{2.75}$ form and if a form which has been reduced below the oxidation state $MoO_{2.75}$ is put onstream it will tend to be oxidized to this stable form under hydration reaction conditions.

In accordance with this invention, an olefin is hydrated to an alcohol by passing it together with water over a molybdenum oxide catalyst which is reduced to an oxidation level below that corresponding to the formula $MoO_{2.75}$, under hydration conditions of temperature, pressure and water to olefin mole ratio. Although both the oxides of molybdenum having an oxidation state higher the stable form $MoO_{2.75}$ and the oxides of molybdenum having an oxidation state lower than this stable form have the common characteristic of tending to assume the stable form under hydration conditions, we have found that oxides of molybdenum which have been reduced below $MoO_{2.75}$ have greater catalytic activity than oxides having an oxidation state higher than $MoO_{2.75}$. It is most preferable to employ an oxide which has been reduced as far as possible to $MoO_{2.75}$, since $MoO_2$ is the most active form of molybdenum oxide in terms of hydration activity. A further important reason for employing an oxide which is reduced below the stable form is that these reduced oxides are not soluble in water and we have found that they will not erode under hydration reaction conditions, whereas both the catalytically stable form of molybdenum oxide and oxides of molybdenum having an oxidation state higher than the stable form will form aqueous colloids and therefore tend to erode under hydration reaction conditions. It is noted that as used in this application the word "soluble" refers to the formation of a colloidal suspension or solution rather than to the formation of a true solution. It is highly desirable to employ an oxide which has been reduced as far as possible to $MoO_2$ since the furthest the oxide is reduced from the catalytically stable form, $MoO_{2.75}$, the longer it takes for it to become oxidized to this stable form and therefore the longer it remains insoluble. Therefore, in accordance with this invention the most preferable catalyst to be employed is $MoO_2$ both in terms of hydration activity and in terms of insolubility under reaction conditions.

The hydration of olefins in the presence of a solid catalyst is most advantageously carried out at elevated pressures. For example, pressures between 500 and 20,000 pounds per square inch gauge should be employed. High pressures are generally favorable in reactions, such as olefin hydration, where a plurality of molecules is being condensed to form a single molecule and whatever pressure is employed should be sufficiently high to allow the reaction to proceed. It is also important that the pressure should be great enough to maintain in the liquid state a sufficient portion of the water present to wash away product alcohol which tends to accumulate at the catalyst. If no liquid water is present to continually wash the catalyst, product alcohol tends to adhere thereto and block the catalyst from exposure to fresh olefin and water, thereby appreciably decreasing the extent of hydration. Liquid water serves as a solvent for this product alcohol, thereby removing it from the surface of the catalyst and allowing the catalyst to be available for exposure to fresh reactants. Generally, about 10 percent of the water in the reactor is present in liquid form and preferably at least about 90 percent of the water in the reactor is in liquid form. If the alcohol being formed has a molecular weight sufficiently high so that it does not dissolve in water, such as some $C_4$ and higher alcohols, it is advantageous to add an extraneous solvent to the system to remove this product alcohol from the surface of the catalyst. Examples of such extraneous solvents which can be employed are oxygenated organic compounds which are miscible with the liquid water present in the system to form solvent-water liquid mixtures in which the higher molecular weight product alcohols will dissolve such as, for example, dioxane, acetone, ethylene glycol monomethyl ether, acetic acid, methyl alcohol, ethyl alcohol, normal propyl alcohol, isopropyl alcohol, isobutyl alcohol, etc.

It is seen that the hydration of olefins in accordance with a preferred embodiment of the invention is a combination liquid-gas phase reaction wherein at least a portion of the water present is in the liquid phase whereas the olefin present is substantially in the gaseous phase. In such a reaction medium it is necessary for the gaseous olefin to traverse a film of liquid water on the surface of the catalyst so that olefin and water are together exposed to the catalyst surface. Generally, in such reactions, where the catalyst is covered by a liquid film comprising one of the reactants and the other reactant, as a gas, must traverse this film so that it too can be exposed to the surface of the catalyst, a downflow reaction system is most advantageous. The reason for this is that downflow systems through a fixed catalytic bed cause the liquid to trickle through the reactor rather than fill it completely and such a trickling effect results in only a very thin liquid film over the catalyst which the gases in the system can easily traverse. In spite of this, we have found that highly superior conversions are achieved by reacting olefin and water in the presence of a mixed bed of molybdenum oxide catalyst in upflow reactor operation wherein at least the major portion of the catalyst is submerged beneath a level of liquid. This discovery is particularly surprising since the reactor system has water present in liquid form together with olefin substantially in gaseous form and it would appear that under upflow operation the film of liquid on the catalyst should be appreciably greater than would occur in downflow operation where a trickling movement of the liquid water would be expected to produce the thinnest liquid film over the catalyst.

We have found that the best form of molybdenum oxide to employ as a hydration catalyst is $MoO_2$ because of its high activity for the hydration of olefins and also because of its low tendency to erode in water. As the total throughput over the catalyst increases, the catalyst tends to assume the higher, more stable catalytic valence state, $MoO_{2.75}$, which is less active than the $MoO_2$ valence state and which erodes in the presence of the water reactant, passing out of the reactor as an aqueous colloid. Although this could result in high losses of catalyst we have discovered a process whereby this colloidal form of the catalyst can be facilely recovered and employed as a catalyst, thereby avoiding any loss of catalytic material.

According to this process, olefin and water are passed through a hydration reactor under hydration conditions in the presence of a fixed bed of solid catalyst having an approximate formula of $MoO_2$. After a sufficiently long throughput interval the catalyst tends to erode into the water flowing over it. The effluent from the reactor comprises unreacted olefin, product alcohol and aqueous colloidal molybdenum oxide. In accordance with this embodiment of the invention, sufficient water is added to this reactor effluent stream to accomplish the complete removal in a distillation column of the alcohol present as an alcohol-water azeotrope and also to provide a sufficient excess of water after the completion of the azeotropic distillation to maintain all the molybdenum oxide in colloidal solution, thereby advantageously preventing its deposition as a dry solid in the still. This distillation is either carried out continuously or batchwise. If this distillation is carried out batchwise, at the completion of the alcohol-water azeotrope distillation the still temperature abruptly rises to the boiling point of water to signify that the alcohol has been completely removed. Therefore, in a batchwise distillation the distillation is continued until the still temperature reaches the boiling point of water at which time the distillation is discontinued.

Following the removal of the product alcohol as an alcohol-water azeotrope, the colloidal catalyst remains in the excess of water which has been provided and is removed from the column for recycling to the reactor. If the unreacted olefin boils higher than the alcohol-water azeotrope it need not be distilled off but can be recycled to the reactor together with the aqueous molybdenum oxide colloid and if the olefin boils lower than this azeotrope it can be separated as a separate fraction for recycling prior to the distillation of the azeotrope. The aqueous molybdenum oxide colloid is charged to the reactor together with makeup water and olefin and passed through the reactor in the presence of the fixed bed of uneroded molybdenum oxide catalyst. In this manner the olefin and water reactants advantageously have the opportunity not only to contact the fixed bed of uneroded catalyst but also have the opportunity to contact the colloidal particles of molybdenum oxide being recycled through the system. The colloidal particles advantageously have a high geometrical surface area as compared to the same weight of catalyst as an uneroded fixed bed. Furthermore, contact between the reactants and the catalyst in the colloidal state is more intimate than contact between the reactants and a catalyst as a fixed bed. Therefore, the eroded catalyst is not only facilely recovered but is advantageously employed in the process.

The alcohol which has been removed as an azeotrope together with water is subsequently separated from the water. This separation of the alcohol from the water is accomplished by any suitable means. For example, a substance such as diisopropyl ether, benzene, etc. can be added which forms an azeotrope with water which boils at a lower boiling point than the alcohol-water azeotrope. In this manner the water is removed as a separate azeotrope, leaving behind pure alcohol product.

The process of this invention is adapted for the recovery of aqueous colloidal molybdenum oxide catalyst in any case where the product alcohol forms an azeotrope with water. Typical instances where this process is employed is in the production of ethyl alcohol, isopropyl alcohol, secondary butyl alcohol, tertiary butyl alcohol, tertiary amyl alcohol, secondary amyl alcohol, etc.

The aqueous colloidal molybdenum oxide solution which is recovered can be advantageously employed without being recycled to the system. Instead, it can be continuously charged to a separate reactor together with fresh water and charge olefin. Such an alternate arrangement is desirable since it is especially advantageous to carry out high pressure reactions, such as olefin hydration, in a plurality of small diameter tubular vessels rather than in a large diameter reaction chamber. Large diameter reaction chambers are necessary when a fixed bed of solid catalyst is employed but such large diameter chambers are not well suited for high pressure conditions since they are not as strong at elevated pressures as small diameter tubular type reactors. Accordingly, we find it especially desirable to circulate eroded aqueous colloidal molybdenum oxide, which is removed from a fixed bed reactor and freed of product alcohol, to small, high pressure tubular reactors where it is contacted with additional water and olefin as a separate reaction system.

Instead of being salvaged from a reactor in which a fixed bed of water-soluble molybdenum oxide is employed, a catalytic colloidal solution of molybdenum oxide can be prepared directly by preparing a solution of soluble molybdenum oxide in water. In the latter case, the soluble molybdenum oxide is dissolved in water as a colloid and is circulated together with olefin through a plurality of small diameter tubular high pressure reactors whereby contact between the colloidal molybdenum oxide particles, water and olefin is achieved. After discharge from the high pressure tubular reactors the soluble molybdenum oxide colloid is readily recovered for recycling through the tubular reactors in the same manner as was described in the case of the fixed bed reactor. By employing the catalyst in colloidal form, not only can the reaction advantageously take place in small diameter tubular reactors but also the advantage is obtained of having a much larger catalytic surface area for a given weight of catalyst as compared to the employment of the same weight of solid catalyst in a fixed bed. In this respect the use of colloidal catalyst particles in a liquid reaction medium is analogous to the use of a fluid catalyst in a gaseous reaction medium.

The water eroded catalyst exists as a colloid rather than as a true solution. Therefore, if the product alcohol being formed has a molecular weight sufficiently high so that it does not dissolve in the water which is present, it will tend to adhere to the surface of these colloidal catalyst particles and prevent fresh reactants from contacting them. In this case it is advantageous to employ an oxygenated organic compound which is miscible with water to form a solution which will dissolve the product alcohol and remove it from the surface of the colloidal catalyst particles. Whatever solvent is employed should preferably boil higher than the product alcohol-water azeotrope so that it can be continually recycled with the aqueous colloidal solution of catalyst without employing additional recovery steps for its removal and readdition to the catalyst colloidal solution being recycled. For the same reason, if the solvent employed forms an azeotrope with water, this azeotrope should preferentially have a boiling point higher than that of the product alcohol-water azeotrope.

In order to illustrate the superior activity of the $MoO_2$ catalyst, in contrast to the catalytically stable form, $MoO_{2.75}$, a sample of $MoO_2$ catalyst and a sample of $MoO_{2.75}$ catalyst were each prepared. The $MoO_{2.75}$ catalyst was prepared by passing isopropyl alcohol at a space velocity of one liquid volume per hour per volume of catalyst over $MoO_3$ at a reduction temperature of 482° F. A negative heat of reduction decreased the bed temperature to a minimum of 426° F. after which time the temperature rose to a maximum of 521° F., indicating that the reduction had gone as far as possible. Total time of this reduction was about eight hours. The catalyst product had a formula of $MoO_{2.75}$ and its surface was changed from hard and smooth to fuzzy and porous, while the appearance was changed from a whitish color having a pale green tinge to dark gray with a slightly purplish tinge.

The $MoO_2$ catalyst was prepared by reducing $MoO_3$ with hydrogen at a gaseous space velocity of 316 volumes per hour per volume of catalyst for a period of five hours at a temperature of 752° F. The reduced catalyst was light gray with metallic-like flecks throughout and possessed a metallic luster.

Table 1 shows the hydration activity of each of these catalysts when employed in a fixed catalytic bed reactor having a downflow circulation. Table 1 shows the conversion of propylene to isopropyl alcohol when employing each of these catalysts at various propylene space velocities. The pressures in all the runs shown were between 3650 and 3675 pounds per square inch gauge and the temperatures were approximately 520° F. About 1.8 moles of propylene per hour and about 26 moles of water per hour were passed through the system.

*Table 1*

| Propylene space velocity—Liquid volumes of propylene per hour per volume of catalyst | Conversion, mole percent | |
|---|---|---|
| | $MoO_{2.75}$ catalyst | $MoO_2$ catalyst |
| 0.923 | | 55.4 |
| 1.03 | 49.2 | |
| 1.08 | 49.3 | |
| 1.210 | 38.7 | |
| 1.224 | | 43.8 |
| 1.250 | 37.0 | |

Table 1 shows that increased conversions are achieved by employing the $MoO_2$ catalyst as compared to the use of the $MoO_{2.75}$ catalyst. In addition to the increased conversions which are attained as shown in Table 1 by the use of the $MoO_2$ catalyst the additional important advantage achieved is that the $MoO_2$ catalyst is insoluble in water and therefore this oxide form of molybdenum does not erode in the presence of water during the hydration reaction.

All the tests which were performed in obtaining the data shown in Table 1 were performed by passing the reactants downflow through a reactor containing a fixed bed of solid catalyst. Table 2 presents data showing the conversion of propylene to isopropyl alcohol by passing propylene and water in upflow operation over an $MoO_2$ catalyst which had been prepared by hydrogen reduction of $MoO_3$. The data shown in Table 2 was taken at a pressure of 3675 pounds per square inch gauge, a temperature of 520° F. and a water to olefin mole ratio of approximately 20. Table 2 shows the conversions to the alcohol which are attained at the various space velocities shown.

*Table 2*

| Propylene space velocity—Liquid volumes of propylene per hour per volume of catalyst | Alcohol yield, mole percent |
|---|---|
| 0.800 | 75.80 |
| 0.793 | 73.60 |
| 0.967 | 71.32 |

The data in Table 2, as compared to that shown in Table 1, indicate the conversion to the alcohol is substantially higher when upflow operation is employed as compared to the conversion achieved employing the same catalyst in downflow operation.

A test was made to illustrate the use of an aqueous colloidal solution of molybdenum oxide as an hydration catalyst. Fifty grams of catalyst which had been produced by isopropyl alcohol reduction of $MoO_3$ to $MoO_{2.75}$ were slurried in 250 cc. of water. The resulting solution was filtered through a Fisher No. 9–795 filter and the filtrate containing 20 grams of alcohol-reduced catalyst was added to a bomb together with 7.4 moles of propylene. The water to olefin mole ratio was 1.88. The temperature was raised to 532° F. at which point the pressure maximized at 2800 pounds per square inch gauge. The contact time was one hour and the conversion to isopropyl alcohol amounted to 13.5 percent.

A further example illustrates the use of a water solution of the soluble form of molybdenum oxide in a continuous hydration process. Fifty grams of catalyst produced by isopropyl alcohol reduction of $MoO_3$ to $MoO_{2.75}$ are slurried in 250 cc. of water and the resulting solution is filtered through a Fisher 9–795 filter and a filtrate containing 20 grams of catalyst in colloidal form is recovered. This aqueous colloidal catalyst is charged together with 7.4 moles of propylene to a tubular hydration reactor having an internal diameter of 5/10 inches. The water to olefin mole ratio is 1.88. The hydration temperature is 532° F. and the pressure is 2800 pounds per square inch gauge. Unreacted propylene is allowed to flash off from the reactor effluent for recycle to the reactor and the olefin-free mixture is then mixed with 250 cc. of water and charged to a distillation column where an azeotrope of isopropyl alcohol and water is removed at 80.4° C. An aqueous colloidal solution of the catalyst is recovered from the bottom of the distillation column, mixed with additional charge olefin and water and recycled to the tubular reactor. A high conversion to the alcohol is achieved.

The conditions of hydration will depend primarily on the olefin being converted. Broadly, pressures of approximately 500 pounds per square inch gauge to 20,000 pounds per square inch gauge, temperatures of approximately 250° F. to 800° F., space velocities of approximately 0.2 to 5.0, and water to olefin mole ratios of approximately 1:1 to 50:1 can be employed. The preferred conditions for propylene are 2500 to 4000 pounds per square inch gauge, 450° F. to 600° F., 0.4 to 1.5 liquid volumes of propylene per hour per volume of catalyst and 5:1 to 25:1 water to olefin mole ratios. The preferred conditions for ethylene are 3000 to 5000 pounds per square inch gauge, 575° F. to 650° F., 0.4 to 1.5 liquid volumes of ethylene per hour per volume of catalyst and 15:1 to 25:1 water to ethylene mole ratio.

This invention can be employed for the hydration of both low and high molecular weight olefins to their corresponding alcohols. Examples of other low molecular weight olefins which can be hydrated in accordance with this invention are butene-1, butene-2 and isobutylene. Examples of higher molecular weight alcohols which can be hydrated in accordance with this invention are pentene-1, 2-methylbutene-1, 3-methylbutene-1, hexene-1, heptene-1, octene-1, etc.

Various changes and modifications can be made without departing from the spirit of this invention or the scope thereof as defined in the following claims.

We claim:

1. A process for the hydration of an olefin to an alcohol comprising passing said olefin and water over a molybdenum oxide catalyst which is reduced to an oxidation level below that corresponding to the formula $MoO_{2.75}$ at a temperature between approximately 250° F. and 800° F., a pressure between approximately 500 pounds per square inch gauge and 20,000 pounds per square inch gauge and a water to olefin mole ratio between approximately 1:1 and 50:1.

2. A process for the hydration of an olefin to an alcohol comprising passing said olefin and water over a catalyst consisting of $MoO_2$ at a temperature between approximately 250° F. and 800° F., a pressure between approximately 500 pounds per square inch gauge and 20,000 pounds per square inch gauge and a water to olefin mole ratio between approximately 1:1 and 50:1.

3. A process for the hydration of propylene to isopropyl alcohol comprising passing propylene and water over a catalyst consisting of $MoO_2$ at a temperature between approximately 250° F., and 800° F., a pressure between approximately 500 pounds per square inch gauge and 20,000 pounds per square inch gauge and a water to propylene mole ratio between approximately 1:1 and 50:1.

4. A process for the hydration of an olefin to an alcohol comprising passing said olefin substantially in vapor form together with liquid water in upflow operation over a molybdenum oxide catalyst which is reduced to an oxidation level below that corresponding to the formula $MoO_{2.75}$ at a temperature between about 250° F. and 800° F., a pressure between about 500 pounds per square inch gauge and 20,000 pounds per square inch gauge, and a water to olefin mole ratio of between about 1:1 and 50:1.

5. A process for the hydration of an olefin to an alcohol comprising passing propylene substantially in vapor form together with liquid water in upflow operation over a molybdenum oxide catalyst which is reduced to an oxidation level below that corresponding to the formula $MoO_{2.75}$ at a temperature between about 250° F. and 800° F., a pressure between about 500 pounds per square inch gauge and 20,000 pounds per square inch gauge, and a water to propylene mole ratio of between about 1:1 and 50:1.

References Cited in the file of this patent

UNITED STATES PATENTS

| | | |
|---|---|---|
| 2,739,133 | Schwarzenbek | Mar. 20, 1956 |

FOREIGN PATENTS

| | | |
|---|---|---|
| 335,551 | Great Britain | Sept. 23, 1930 |
| 671,971 | Great Britain | May 14, 1952 |

UNITED STATES PATENT OFFICE
CERTIFICATE OF CORRECTION

Patent No. 2,995,609                         August 8, 1961

Kenneth J. Frech et al.

It is hereby certified that error appears in the above numbered patent requiring correction and that the said Letters Patent should read as corrected below.

Column 1, line 51, for "$MoO_{2.75}$" read -- $MoO_2$ --.

Signed and sealed this 26th day of December 1961.

(SEAL)
Attest:

ERNEST W. SWIDER                         DAVID L. LADD
Attesting Officer                         Commissioner of Patents